United States Patent
Moreira et al.

(10) Patent No.: US 12,166,959 B2
(45) Date of Patent: Dec. 10, 2024

(54) ANOMALOUS PIXEL DETECTION SYSTEMS AND METHODS

(71) Applicant: Teledyne FLIR Commercial Systems, Inc., Goleta, CA (US)

(72) Inventors: Julie R. Moreira, Goleta, CA (US); Stephanie Lin, Goleta, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 78 days.

(21) Appl. No.: 17/543,538

(22) Filed: Dec. 6, 2021

(65) Prior Publication Data

US 2022/0210399 A1    Jun. 30, 2022

Related U.S. Application Data (60) Provisional application No. 63/132,469, filed on Dec. 30, 2020.

(51) Int. Cl.
| | | |
|---|---|---|
| *H04N 5/33* | (2023.01) | |
| *H04N 17/00* | (2006.01) | |
| *H04N 25/671* | (2023.01) | |

(52) U.S. Cl.
CPC ............ *H04N 17/002* (2013.01); *H04N 5/33* (2013.01); *H04N 25/671* (2023.01)

(58) Field of Classification Search
CPC ...... H04N 17/002; H04N 25/671; H04N 5/33; H04N 9/64; H04N 5/217
USPC .................................................. 348/165, 164
See application file for complete search history.

(56) References Cited

U.S. PATENT DOCUMENTS

| | | |
|---|---|---|
| 8,189,050 B1 | 5/2012 | Hughes et al. |
| 9,756,264 B2 | 9/2017 | Hoelter et al. |
| 10,025,988 B2 * | 7/2018 | Yuan ................... G06T 7/0002 |
| 10,200,643 B2 * | 2/2019 | Sun ..................... H04N 25/671 |
| 10,425,603 B2 | 9/2019 | Kostrzewa et al. |
| 11,012,648 B2 | 5/2021 | Kostrzewa et al. |
| 2009/0092321 A1 | 4/2009 | Liberman et al. |
| 2016/0234489 A1 | 8/2016 | Chiu et al. |

FOREIGN PATENT DOCUMENTS

| | | |
|---|---|---|
| KR | 2014-0035491 A | 3/2014 |
| WO | WO 2014/106278 | 7/2014 |

* cited by examiner

*Primary Examiner* — Trang U Tran
(74) *Attorney, Agent, or Firm* — Haynes and Boone, LLP (57) ABSTRACT

Various techniques are disclosed to provide for detection of temporally anomalous flickering pixels. In one example, a method includes capturing, by a thermal imager of an imaging device, a plurality of thermal images in response to infrared radiation received from a uniform black body, wherein the thermal images comprise a plurality of pixels having associated pixel values. The method also includes determining, for each pixel, a standard deviation of the associated pixel values for the thermal images. The method also includes comparing the standard deviations with a threshold. The method also includes identifying a subset of the pixels as temporally anomalous pixels in response to the comparing. Additional methods, devices, and systems are also provided.

18 Claims, 6 Drawing Sheets

ANOMALOUS PIXEL DETECTION SYSTEMS AND METHODS

CROSS REFERENCE TO RELATED APPLICATIONS

This application claims the benefit of and priority to U.S. Provisional Patent Application No. 63/132,469 filed Dec. 30, 2020 and entitled "ANOMALOUS PIXEL DETECTION SYSTEMS AND METHODS," which is incorporated herein by reference in its entirety.

TECHNICAL FIELD

The present invention relates generally to image processing and, more particularly, to detection of anomalous pixels.

BACKGROUND

Various imaging devices, such as thermal imagers, can be used to capture images including a plurality of pixels arranged in rows and columns. For example, an individual pixel may be associated with a sensor, such as an infrared sensor (e.g., a microbolometer) to capture associated pixel values. Failures and/or defects in the sensors or other components of an imaging device may result in one or more pixels exhibiting anomalous behavior (e.g., "bad pixels").

Conventionally, captured images may be processed to identify and/or mitigate anomalous pixels, such as by applying temporal filtering to their associated pixel values. However, such temporal filtering may not reliably mitigate the effects of flickering pixels that exhibit large fluctuations in their associated pixel values (e.g., large impulses) over time. For example, in some cases, such fluctuations may be incorrectly interpreted as scene motion and excluded from temporal processing. In other cases, such fluctuations may be temporally filtered but only dampened rather than completely removed due to the large magnitude of the pixel value fluctuations.

In some cases, bad pixel replacement processes may replace anomalous pixels (e.g., whether flickering or static). However, such processes may only be beneficial if the anomalous pixels occur at pixel locations (e.g., corresponding to particular rows and columns) that are stable and repeatable over time and multiple power cycles. For some infrared imaging technologies (e.g., strained layer superlattice (SLS) infrared sensors), anomalous pixel locations may vary from cooldown to cooldown. As a result, a new approach is needed to address the problems of anomalous pixels occurring in such cases.

SUMMARY

Various techniques are disclosed to provide for detection of temporally anomalous flickering pixels. For example, such pixels may be identified dynamically during a run-time (e.g., in-field) calibration of a thermal imager. As a result, such pixels may be identified and corrected while an imaging device is used in the field, even if flickering pixels are exhibited by different pixel locations that change over time.

In one embodiment, a method includes capturing, by a thermal imager of an imaging device, a plurality of thermal images in response to infrared radiation received from a uniform black body, wherein the thermal images comprise a plurality of pixels having associated pixel values; determining, for each pixel, a standard deviation of the associated pixel values for the thermal images; comparing the standard deviations with a threshold; and identifying a subset of the pixels as temporally anomalous pixels in response to the comparing.

In another embodiment, a system includes a thermal imager configured to capture a plurality of thermal images in response to infrared radiation received from a uniform black body, wherein the thermal images comprise a plurality of pixels having associated pixel values; and a logic device configured to: determine, for each pixel, a standard deviation of the associated pixel values for the thermal images, compare the standard deviations with a threshold, and identify a subset of the pixels as temporally anomalous pixels in response to the comparing.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

In accordance with embodiments discussed herein, various systems and methods are provided to detect anomalous flickering pixels in infrared imaging systems. In particular, such techniques may be advantageously used to identify flickering pixels that may occur in an infrared imaging system after the system has been factory calibrated and tested. As a result, anomalous flickering pixels may be detected and corrected during use in the field.

Certain infrared imaging systems include techniques for reducing noise in thermal images (e.g., also referred to as thermal image frames). Some techniques include replacing pixels in thermal images that exhibit spurious pixel values (e.g., bad pixels). Other techniques include performing run-time calibration of per pixel offset variations (e.g., typically referred to as a one-point calibration) to generate and apply offset correction terms to reduce fixed pattern noise corresponding to offsets in pixel values occurring at particular pixel locations of a thermal image.

In accordance with various embodiments, bad pixel replacement techniques and run-time calibration techniques can be used to dynamically identify and replace temporally anomalous pixels (e.g., pixels that exhibit changing pixel values over time that do not correspond to an imaged scene, also referred to as flickering pixels).

In some embodiments, bad pixels may be identified dynamically during a run-time calibration of an imaging device using a shutter that provides a uniform black body. While the shutter is closed, the uniform black body is presented to a thermal imager of the imaging device which captures thermal images of the shutter to generate and/or update offset correction terms.

Each pixel (e.g., pixel location) of the captured images has associated pixel values that may vary from image to image. A standard deviation for the pixel values may be calculated for each pixel of the images to provide a standard deviation map. In one embodiment, the standard deviation may be a full standard deviation where a plurality of thermal images may be stored in a memory and then the standard deviation for each pixel may be calculated using the stored thermal images. In another embodiment, the standard deviation may be a running standard deviation where the standard deviation is updated in realtime with each new captured thermal image.

The standard deviation calculated for each pixel may be compared to a threshold. In one embodiment, the threshold may be a predetermined threshold. In another embodiment, the threshold may be scaled to a mean standard deviation calculated for all pixels collectively.

Pixels exhibiting a standard deviation less than the threshold may be determined to exhibit pixel values that vary in an expected range and are not temporally anomalous (e.g., not flickering). However, pixels exhibiting a standard deviation greater than the threshold value may be determined to exhibit pixel values outside the expected range and therefore are temporally anomalous (e.g., flickering) and added to a noisy pixel map.

A bad pixel map (e.g., stored in dynamic random access memory (DRAM)) may be updated to include the temporally anomalous pixels of the noisy pixel map. As a result, the flickering pixels may be replaced using standard bad pixel replacement processing techniques.

Such techniques provide improved image quality for captured thermal images, as the flickering pixels are actually replaced to remove flickering and excess noise that would otherwise obscure scene content and impact image quality. This contrasts with conventional temporal filtering techniques that may reduce some extreme changes in pixel value magnitude for flickering pixels, but may not eliminate all flickering from image to image. Indeed, the techniques provided by the present disclosure are particularly effective at replacing flickering pixels that exhibit significant changes in the magnitude of their associated pixel values (e.g., identified by having a standard deviation that exceeds the threshold) that would otherwise not be sufficiently corrected or mitigated by temporal filtering techniques.

Figure 1:
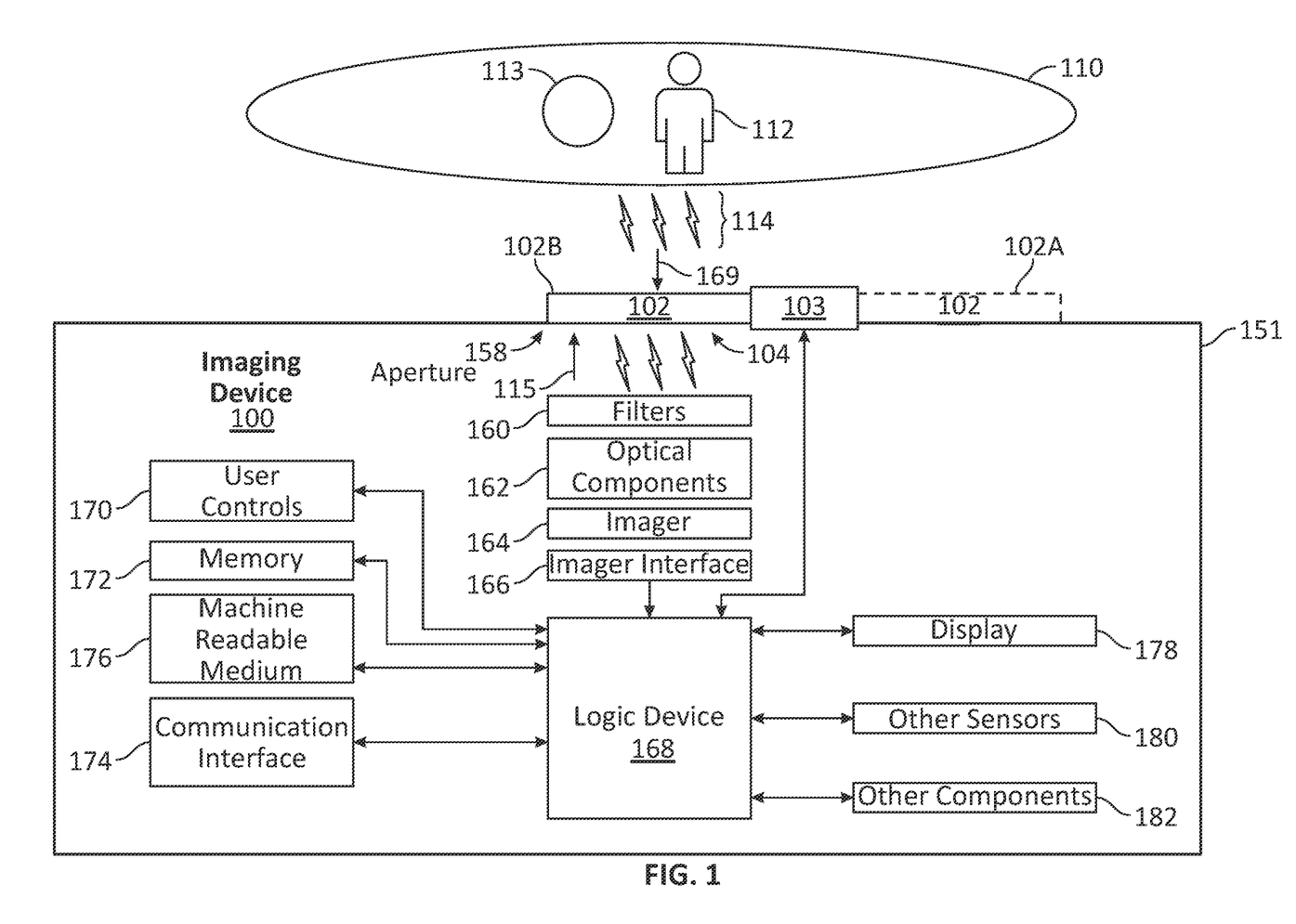
FIG. 1 illustrates a block diagram of an imaging device in accordance with an embodiment of the disclosure.

Turning now to the drawings, FIG. 1 illustrates a block diagram of an imaging device 100 in accordance with an embodiment of the disclosure. As shown, imaging device 100 includes a housing 151 (e.g., a camera body) having an aperture 158, one or more filters 160, one or more optical components 162, an imager 164, an imager interface 166, a logic device 168, user controls 170, a memory 172, a communication interface 174, a machine readable medium 176, a display 178, other sensors 180, and other components 182.

In various embodiments, imaging device 100 (e.g., an imaging system) may be implemented, for example, as a camera system such as a portable (e.g., handheld) camera system, a small form factor camera system implemented as part of another device, a fixed camera system, and/or other appropriate implementations. Imaging device 100 may be positioned to receive electromagnetic radiation 114 of various wavelengths from a scene 110 (e.g., a field of view of imaging device 100). In various embodiments, scene 110 may include various features of interest such as one or more persons 112, objects 113, and/or other features.

Radiation 114 is received through aperture 158 and passes through one or more filters 160 which may be provided to selectively filter particular wavelengths of interest for images to be captured by imager 164. Optical components 162 (e.g., an optical assembly including one or more lenses, additional filters, transmissive windows, and/or other optical components) pass the filtered radiation 114 for capture by imager 164.

Thus, it will be appreciated that filters 160 and/or optical components 162 may operate together to selectively filter out portions of radiation 114 such that only desired wavelengths (e.g., visible light wavelengths, infrared wavelengths, thermal wavelengths, and/or others) and/or desired radiation intensities are ultimately received by imager 164. In various embodiments, any desired combination of such components may be provided (e.g., various components may be included and/or omitted as appropriate for various implementations).

Imager 164 may capture images of scene 110 in response to radiation 114. Imager 164 may include an array of sensors for capturing images (e.g., image frames) of scene 110. In some embodiments, imager 164 may also include one or more analog-to-digital converters for converting analog signals captured by the sensors into digital data (e.g., pixel values) to provide the captured images. Imager 164 will be primarily described herein as a thermal imager configured to capture thermal wavelengths. It will be appreciated that imagers associated with other wavelengths are also contemplated where appropriate.

Imager interface 166 provides the captured images to logic device 168 which may be used to process the images, store the original and/or processed images in memory 172, and/or retrieve stored images from memory 172. In some embodiments, imager interface 166 may provide the captured images directly to memory 172 as shown.

Although a single imager 164 is illustrated, a plurality of imagers 164 and associated components may be provided in other embodiments. For example, different imagers 164 may be provided to capture the same or different wavelengths of radiation 114 simultaneously to provide associated captured images in some embodiments.

Logic device 168 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), and/or any other appropriate combinations of devices and/or memory to perform any of the various operations described herein. Logic device 168 is configured to interface and communicate with the various components of imaging device 100 to perform various method and processing steps described herein. In various embodiments, processing instructions may be integrated in software and/or hardware as part of logic device 168, or code (e.g., software and/or configuration data) which may be stored in memory 172 and/or a machine readable medium 176. In various embodiments, the instructions stored in memory 172 and/or machine readable medium 176 permit logic device 168 to perform the various operations discussed herein and/or control various components of device 100 for such operations.

Memory 172 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, fixed memory, removable memory, and/or other types of memory.

Machine readable medium 176 (e.g., a memory, a hard drive, a compact disk, a digital video disk, or a flash memory) may be a non-transitory machine readable medium storing instructions for execution by logic device 168. In various embodiments, machine readable medium 176 may be included as part of imaging device 100 and/or separate from imaging device 100, with stored instructions provided to imaging device 100 by coupling the machine readable medium 176 to imaging device 100 and/or by imaging device 100 downloading (e.g., via a wired or wireless link) the instructions from the machine readable medium (e.g., containing the non-transitory information).

Logic device 168 may be configured to process captured images and provide them to display 178 for presentation to and viewing by the user. Display 178 may include a display device such as a liquid crystal display (LCD), an organic light-emitting diode (OLED) display, and/or other types of displays as appropriate to display images and/or information to the user of device 100. Logic device 168 may be configured to display images and information on display 178. For example, logic device 168 may be configured to retrieve images and information from memory 172 and provide images and information to display 178 for presentation to the user of device 100. Display 178 may include display electronics, which may be utilized by logic device 168 to display such images and information.

User controls 170 may include any desired type of user input and/or interface device having one or more user actuated components, such as one or more buttons, slide bars, knobs, keyboards, joysticks, and/or other types of controls that are configured to generate one or more user actuated input control signals. In some embodiments, user controls 170 may be integrated with display 178 as a touchscreen to operate as both user controls 170 and display 178. Logic device 168 may be configured to sense control input signals from user controls 170 and respond to sensed control input signals received therefrom. In some embodiments, portions of display 178 and/or user controls 170 may be implemented by appropriate portions of a tablet, a laptop computer, a desktop computer, and/or other types of devices.

In various embodiments, user controls 170 may be configured to include one or more other user-activated mechanisms to provide various other control operations of imaging device 100, such as auto-focus, menu enable and selection, field of view (FoV), brightness, contrast, gain, offset, spatial, temporal, and/or various other features and/or parameters.

Imaging device 100 may include various types of other sensors 180 including, for example, microphones, navigation sensors, temperature sensors, and/or other sensors as appropriate.

Logic device 168 may be configured to receive and pass images from imager interface 166 and signals and data from sensors 180, and/or user controls 170 to a host system and/or other external devices (e.g., remote systems) through communication interface 174 (e.g., through wired and/or wireless communications). In this regard, communication interface 174 may be implemented to provide wired communication over a cable and/or wireless communication over an antenna. For example, communication interface 174 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication interface 174 may include an antenna coupled thereto for wireless communication purposes. In other embodiments, the communication interface 174 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, imaging device 100 and/or its individual associated components may be associated with a particular network link such as for example a URL (Uniform Resource Locator), an IP (Internet Protocol) address, and/or a mobile phone number.

Imaging device 100 may include various other components 182 such as speakers, additional displays, visual indicators (e.g., recording indicators), vibration actuators, a battery or other power supply (e.g., rechargeable or otherwise), and/or additional components as appropriate for particular implementations.

Although various features of imaging device 100 are illustrated together in FIG. 1, any of the various illustrated components and subcomponents may be implemented in a distributed manner and used remotely from each other as appropriate (e.g., through appropriate wired and/or wireless network communication).

Imaging system 100 also includes a shutter 102 that may be selectively inserted into an optical path (e.g., denoted by arrow 169) between scene 110 and imager 164. For example, shutter 102 may be translated (e.g., moved or otherwise positioned) between an open position 102A (e.g., illustrated in broken lines) outside the optical path 169 and a closed position 102B (e.g., illustrated in solid lines) in the optical path 169. This translation may be performed, for example, by an actuator 103 controlled by logic device 168. For example, in various embodiments, actuator 103 may rotate, slide, and/or otherwise translate shutter 102 between open position 102A and closed position 102B.

While shutter 102 is in the open position 102A, radiation 114 passes from scene 110 through aperture 158 and is received by filters 160, optical components 162, and imager 164. Accordingly, while shutter 102 is in the open position 102A, imager 164 captures images (e.g., thermal images) of scene 110.

However, while shutter 102 is in the closed position 102B, incident radiation 114 is blocked from passing through aperture 158. As a result, while shutter 102 is in the closed position 102B, imager 164 captures images of thermal radiation 115 received from a surface 104 of shutter 102. For example, in embodiments where imager 164 is a thermal imager, surface 104 of shutter 102 may be a temperature controlled uniform black body configured to present a uniform field of thermal radiation 115 to imager 164. For example, in some embodiments, surface 104 may be implemented by a uniform blackbody coating.

Thus, for example, surface 104 may be used with imager 164 to a perform a non-uniform correction (NUC) process, such as a flat field correction (FFC) process set forth in U.S. patent application Ser. No. 12/391,156 filed Feb. 23, 2009, which is incorporated herein by reference in its entirety. Surface 104 may emit known amounts and known wavelengths of thermal radiation. Accordingly, thermal images captured of thermal radiation 115 received from surface 104 by imager 164 may be expected to exhibit predetermined known pixel values. Deviations (e.g., associated with minor differences in the response of individual sensors associated with the pixels or inconsistencies in other circuitry) between the expected pixel values and the actual captured pixel values may be used to generate offset correction terms (e.g., offset values) that may be applied to captured thermal images to compensate for the deviations. As a result, when thermal images are captured of scene 110, the correction terms may be applied to the associated pixel values to compensate for non-uniformities. In various embodiments, a NUC process may be periodically performed to update the correction terms as imaging device 100 is operated over time (e.g., to compensate for non-uniformities that may vary with time, device temperature, and/or other factors.

Although shutter 102 is illustrated as being mounted external to housing 101, other implementations are contemplated. For example, in various embodiments, the shutter 102 may be instead provided in other locations in the optical path 169 between scene 110 and imager 164 as appropriate.

Figure 2:
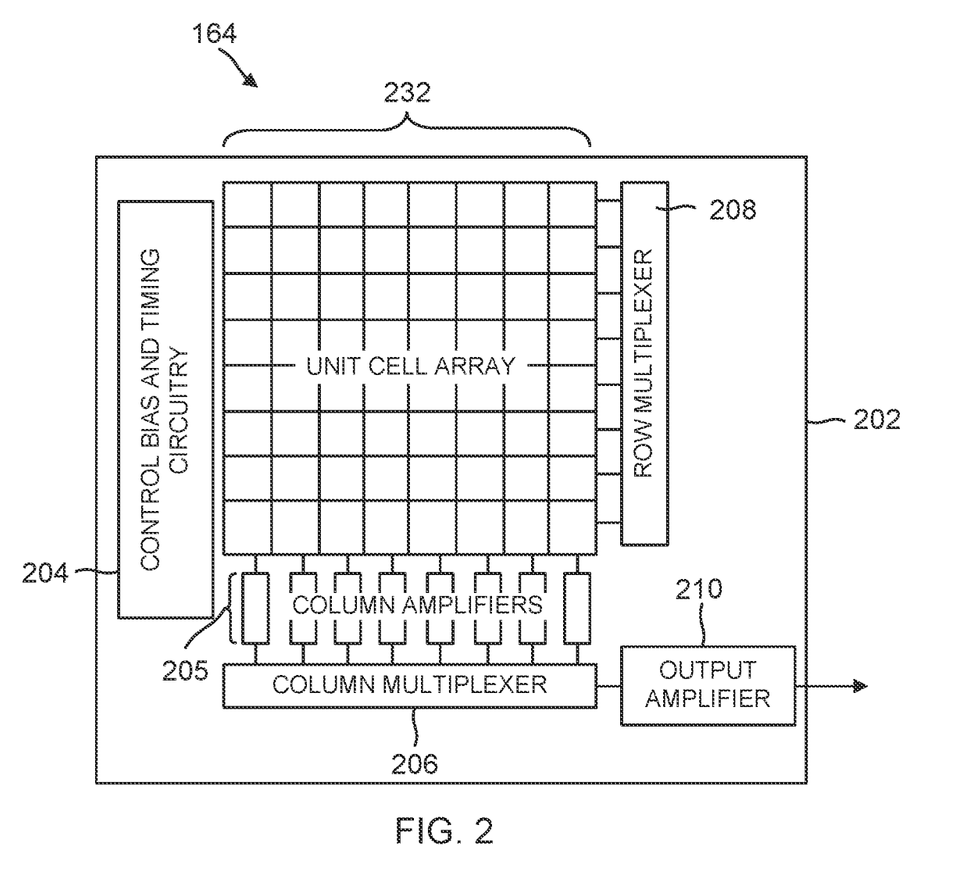
FIG. 2 illustrates a block diagram of a thermal imager in accordance with an embodiment of the disclosure.

FIG. 2 illustrates a block diagram of imager 164 in accordance with an embodiment of the disclosure. In this illustrated embodiment, imager 164 is a focal plane array (FPA) including an array of unit cells 232 and a read out integrated circuit (ROIC) 202. Each unit cell 232 may be provided with an infrared detector (e.g., a microbolometer or other appropriate sensor) and associated circuitry to provide image data for a pixel of a captured thermal image frame. In this regard, time-multiplexed electrical signals may be provided by the unit cells 232 to ROIC 202.

ROIC 202 includes bias generation and timing control circuitry 204, column amplifiers 205, a column multiplexer 206, a row multiplexer 208, and an output amplifier 210. Image frames captured by infrared sensors of the unit cells 232 may be provided by output amplifier 210 to logic device 168 and/or any other appropriate components to perform various processing techniques described herein. Although an 8 by 8 array is shown in FIG. 2, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Figure 3:
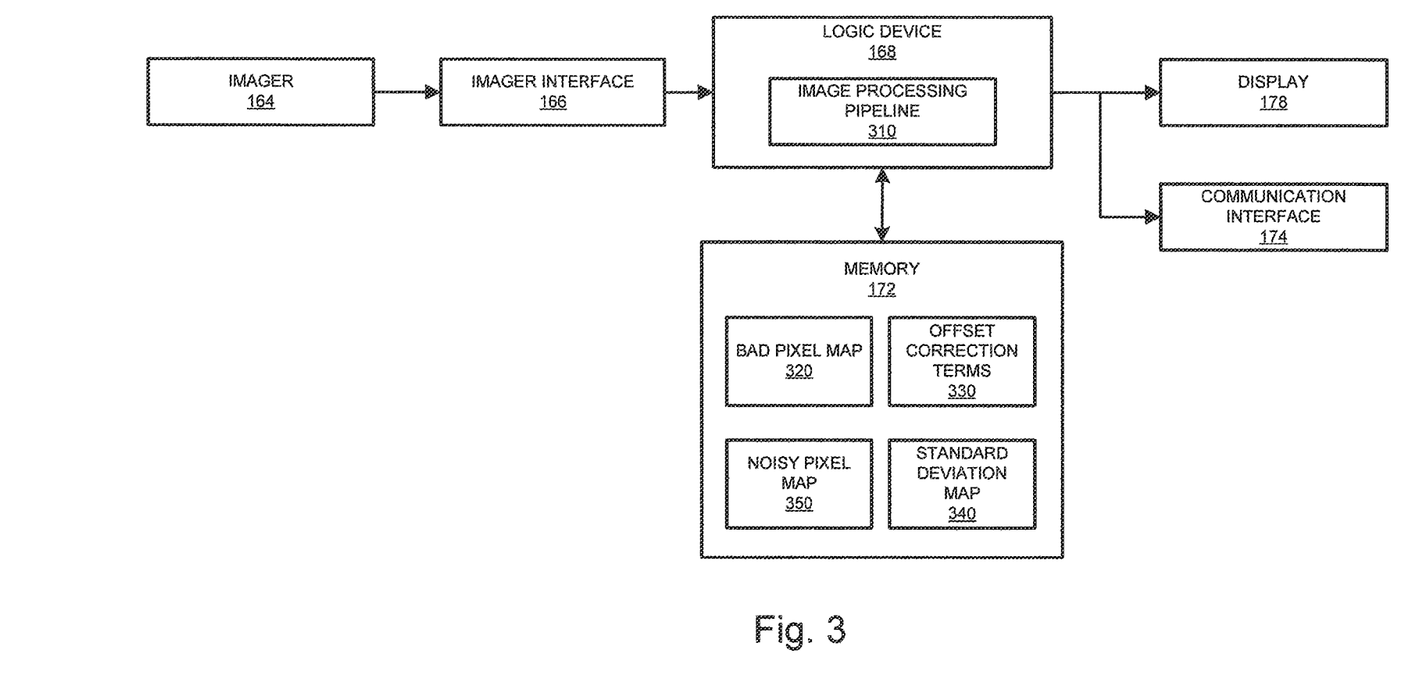
FIG. 3 is a block diagram of signal flow through portions of an imaging device in accordance with an embodiment of the disclosure.

FIG. 3 is a block diagram of signal flow through portions of imaging device 100 in accordance with an embodiment of the disclosure. As shown, thermal images are provided from imager 164 to imager interface 166 and on to logic device 168 as discussed. Logic device 168 includes an image processing pipeline 310 which performs various operations on the thermal images including, for example, debayering, sharpening, color correction, offset correction, bad pixel replacement, and/or others).

As shown, memory 172 (e.g., DRAM) includes various information (e.g., data) that may be provided to logic device 168 for use by image processing pipeline 310 and/or by logic device 168 generally. Bad pixel map 320 identifies pixels corresponding to particular unit cells 232 that exhibit temporally anomalous and/or static anomalous behavior. In some embodiments, bad pixel map 320 may be populated during a factory calibration of imaging device 100 and may be further updated during calibration operations performed during run-time in the field in accordance with techniques discussed herein.

Offset correction terms 330 identify values that may be added or subtracted to pixel values for rows of pixels, columns of pixels, and/or individual pixels to reduce fixed pattern noise associated with imager 164. In some embodiments, offset correction terms 330 may be generated during a factory calibration of imaging device 100 and may be further updated during calibration operations performed during run-time in the field in accordance with techniques discussed herein.

Standard deviation map 340 provides a standard deviation calculated for each pixel (e.g., each unit cell 232) of imager 164. For example, pixel values of corresponding pixels in a plurality of captured thermal images may be processed and a standard deviation of the pixel values may be determined and stored in the standard deviation map 340. Thus, standard deviation map 340 may include a standard deviation associated with each pixel.

Noisy pixel map 350 (e.g., also referred to as a temporally anomalous pixel map or a flickering pixel map) identifies pixels having a standard deviation (e.g., provided by standard deviation map 340) that exceed a threshold. In this regard, such pixels may exhibit sufficiently large fluctuations in their associated pixel values (e.g., as evidenced by their associated standard deviation exceeding a threshold) that they may be considered anomalous flickering pixels. Accordingly, bad pixel map 320 may be updated to include the pixels identified in noisy pixel map 350.

As further shown in FIG. 3, processed images may be provided from logic device 168 to display 178 and/or communication interface 174.

Figure 4:
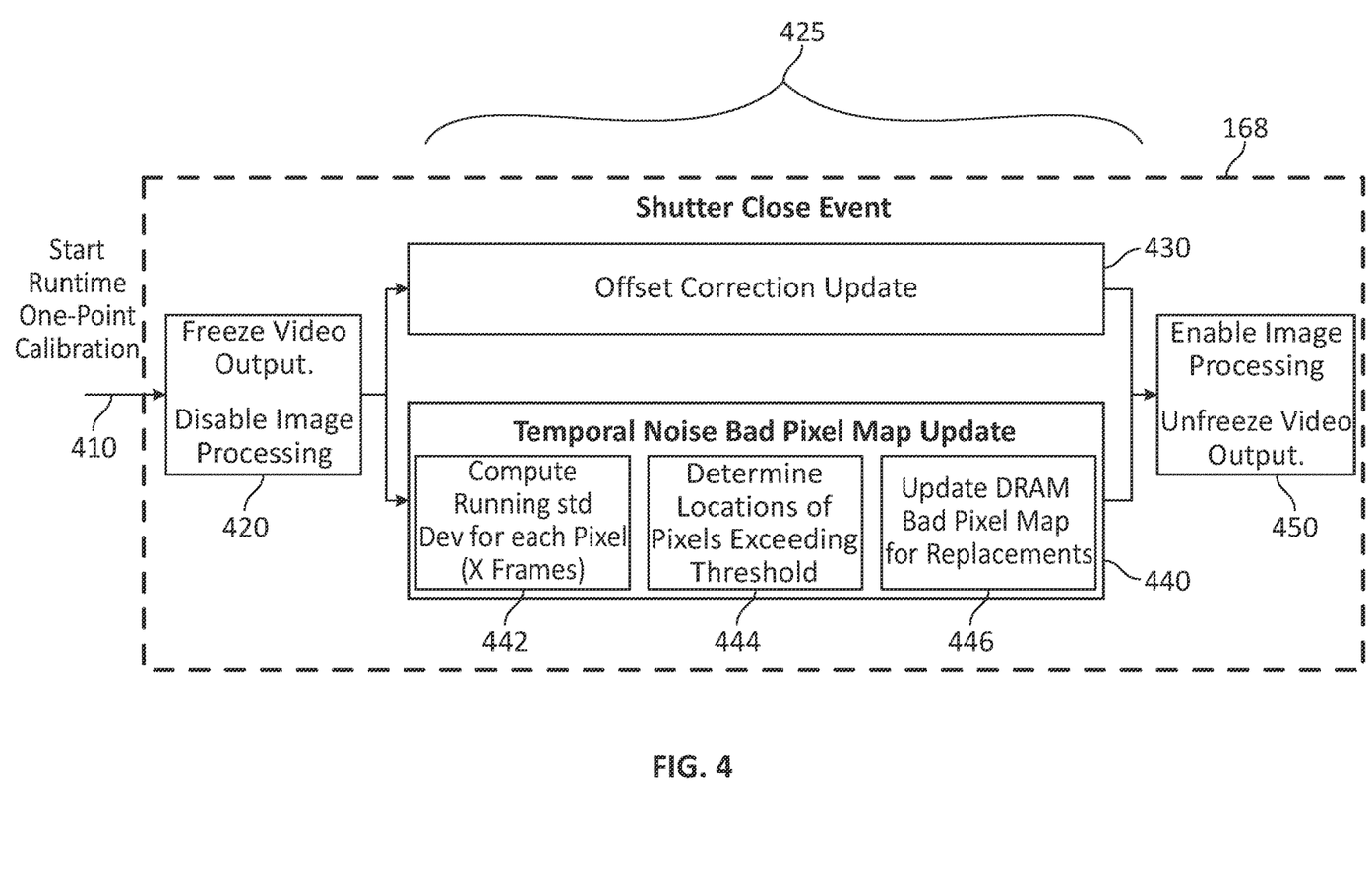
FIG. 4 is a block diagram of calibration operations performed by a logic device of an imaging device in accordance with an embodiment of the disclosure.

FIG. 4 is a block diagram of calibration operations performed logic device 168 in accordance with an embodiment of the disclosure. For example, the operations shown in FIG. 4 may be performed while imaging device 100 is operated in the field.

In block 410, a calibration is initiated. In some embodiments, the operation may be initiated automatically (e.g., periodically and/or in response to one or more triggering events) by logic device 168. In some embodiments, the calibration may be initiated by a user operating one or more user controls 170 of imaging device 100.

In block 420, logic device 168 freezes (e.g., disables or stops updating) the output of thermal images (e.g., static images and/or video comprising a plurality of images) provided to display 178 and/or communication interface 174. Also in block 420, logic device 168 disables some or all processing performed by image processing pipeline 310.

In accordance with various techniques of the present disclosure, two different pixel detection/correction techniques may be performed simultaneously in parallel with each other during a calibration time period 425. In particular, offset correction may performed in block 430, while anomalous pixel detection may be performed in block 440.

For example, in block 430, logic device 168 operates shutter 102 (e.g., operates actuator 103 to move shutter 102 to closed position 102B) and imager 164 to generate and/or update offset correction terms 330. For example, block 430 may include capturing a plurality of thermal images (e.g., X number of image frames) of surface 104 of shutter 102 while it is in the closed position 102B.

Simultaneously, in block 440, logic device 168 performs various anomalous pixel detection operations (e.g., sub-blocks 442, 444, and 446) using the thermal images captured in block 430. Because surface 104 of shutter 102 provides a uniform black body, substantial frame-to-frame variations in pixel values in the thermal images captured in block 430 may be interpreted as flickering anomalous pixels.

In sub-block 442, logic device 168 calculates a standard deviation for each pixel to populate standard deviation map 340 as discussed.

In sub-block 444, logic device 168 compares the standard deviations in standard deviation map 340 with a threshold, identifies a subset of the pixels having standard deviation values that exceed a threshold (e.g., therefore identifying them as temporally anomalous pixels), and populates noisy pixel map 350 with the identified pixels as discussed.

In sub-block 446, logic device 168 updates bad pixel map 320 with the pixels identified in noisy pixel map 350. As a result, bad pixel map 320 will identify anomalous pixels that were originally detected during a factory calibration and also identify anomalous pixels that were subsequently detected during a run-time calibration (block 440).

Following blocks 430 and 440, logic device 168 operates actuator 103 to move shutter 102 to open position 102A. In block 450, logic device 168 unfreezes (e.g., enables or begins updating) the output of thermal images provided to display 178 and/or communication interface 174. Also in block 450, logic device enables some or all processing performed by image processing pipeline 310. Thus, following block 450, imager 164 may return to capturing thermal images of scene 110.

Figure 5:
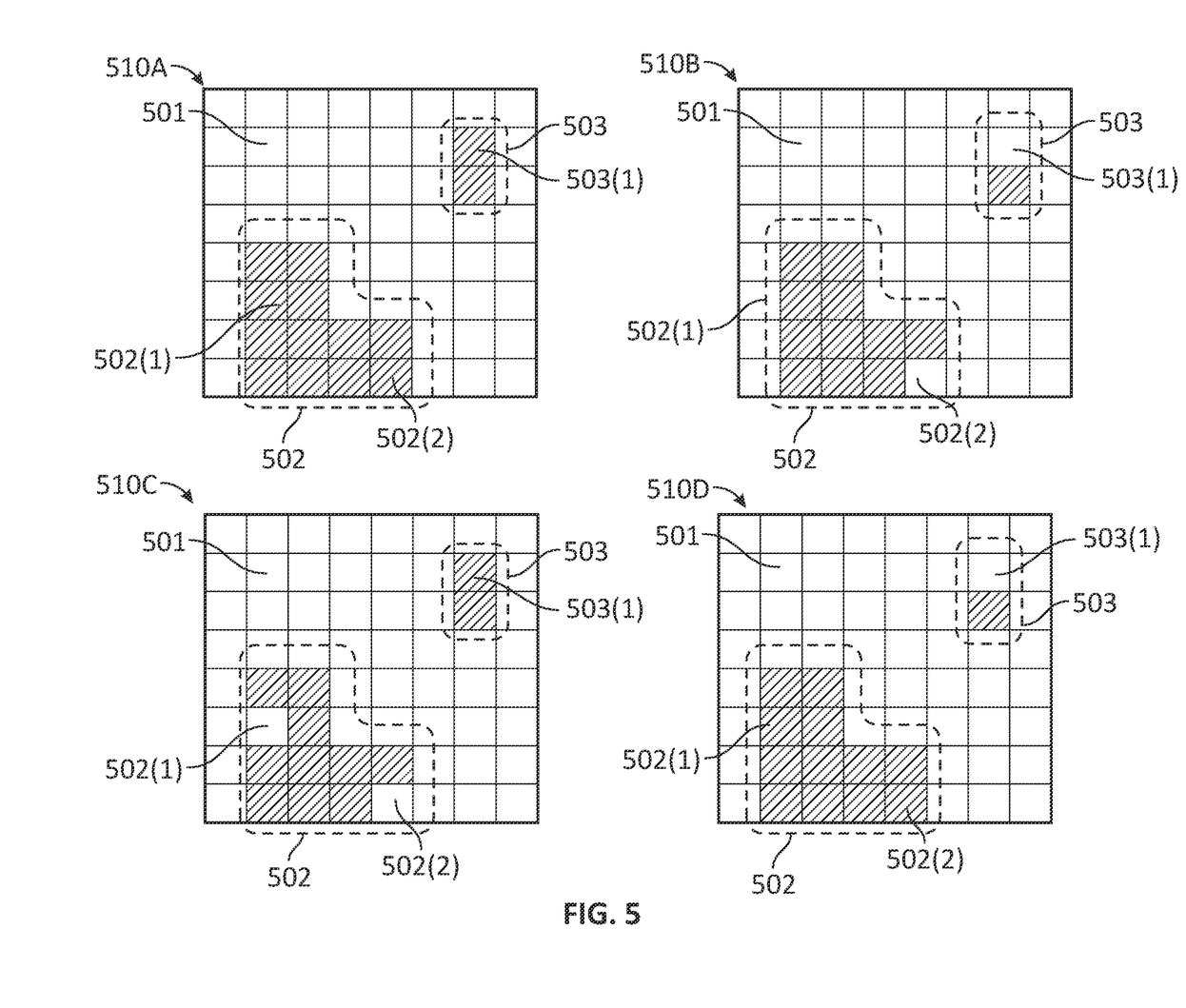
FIG. 5 illustrates thermal images captured by an imaging device in accordance with an embodiment of the disclosure.

FIG. 5 illustrates a plurality of thermal images 510A-D successively captured by imager 164 during calibration time period 425. In this regard, thermal images 510A-D are thermal images captured of thermal radiation 115 received from surface 104 (e.g., a uniform blackbody) of shutter 102. Thermal images 510A-D include pixels 501 that exhibit pixel values consistent with or close to the expected thermal radiation associated with surface 104 (e.g., illustrated by unshaded pixels). Thermal images 510A-D also include groups of pixels 502 and 503 that exhibit anomalous pixel values inconsistent with the expected thermal radiation associated with surface 104 (e.g., illustrated by shaded pixels).

As shown, a majority of anomalous pixels 502 and 503 maintain static anomalous pixel values in each of the successively captured thermal images 510A-D which may be identified by block 430 and corrected with offset correction terms 330. However, pixels 502(1) and 502(2) of pixel group 502 and pixel 503(1) of pixel group 503 exhibit changing pixel values in different thermal images 510A-D.

For example, pixel 502(1) exhibits anomalous pixel values in thermal images 510A, 510B, and 510D, but an expected pixel value in thermal image 510C. Pixel 502(2) exhibits anomalous pixel values in thermal images 510A and 510D, but expected pixel values in thermal image 510B and 510C. Pixel 503(1) exhibits anomalous pixel values in thermal images 510A and 510C, but expected pixel values in thermal images 510B and 510D.

Thus, it will be appreciated that pixels 502(1), 502(2), and 503(1) are flickering anomalous pixels that change over time and thus exhibit different pixel values among the successively captured thermal images 510A-D.

As discussed, a standard deviation of the pixel values for each pixel can be determined for the thermal images captured during calibration time period 425. For example, the following Table 1 identifies example pixel values and standard deviations calculated for each of pixels 501, 502(1), 502(2), and 503(1). For ease of understanding, the normal expected pixel value consistent with thermal radiation 115 associated with surface 104 is assumed to be approximately 100, and the anomalous pixel values are substantial variances from that number. It will be appreciated that various pixel values set forth in Table 1 are provided for purposes of example only, and that the actual pixel values may vary. Minor changes in frame-to-frame pixel values are also provided to account for small variations in pixel values associated with environmental and/or operational factors.

TABLE 1

| Pixel | Thermal image 510A pixel value | Thermal image 510B pixel value | Thermal image 510C pixel value | Thermal image 510D pixel value | Standard deviation |
|---|---|---|---|---|---|
| Pixel 501 | 100 (normal) | 102 (normal) | 98 (normal) | 101 (normal) | 1.48 |
| Pixel 502(1) | 602 (anomalous) | 605 (anomalous) | 101 (normal) | 603 (anomalous) | 217.52 |
| Pixel 502(2) | 901 (anomalous) | 100 (normal) | 102 (normal) | 904 (anomalous) | 400.75 |
| Pixel 503(1) | 803 (anomalous) | 101 (normal) | 804 (anomalous) | 102 (normal) | 351.00 |

As set forth in Table 1, each of pixels 501, 502(1), 502(2), and 503(3) exhibit different standard deviations. By setting a standard deviation threshold such as, for example 200, all of pixels 502(1), 502(2), and 503(3) can be identified as flickering temporally anomalous pixels, while pixel 501 can be identified as non-flickering. In various embodiments, the standard deviation threshold may be adjusted as appropriate to accurate identify flickering temporally anomalous pixels.

Figure 6:
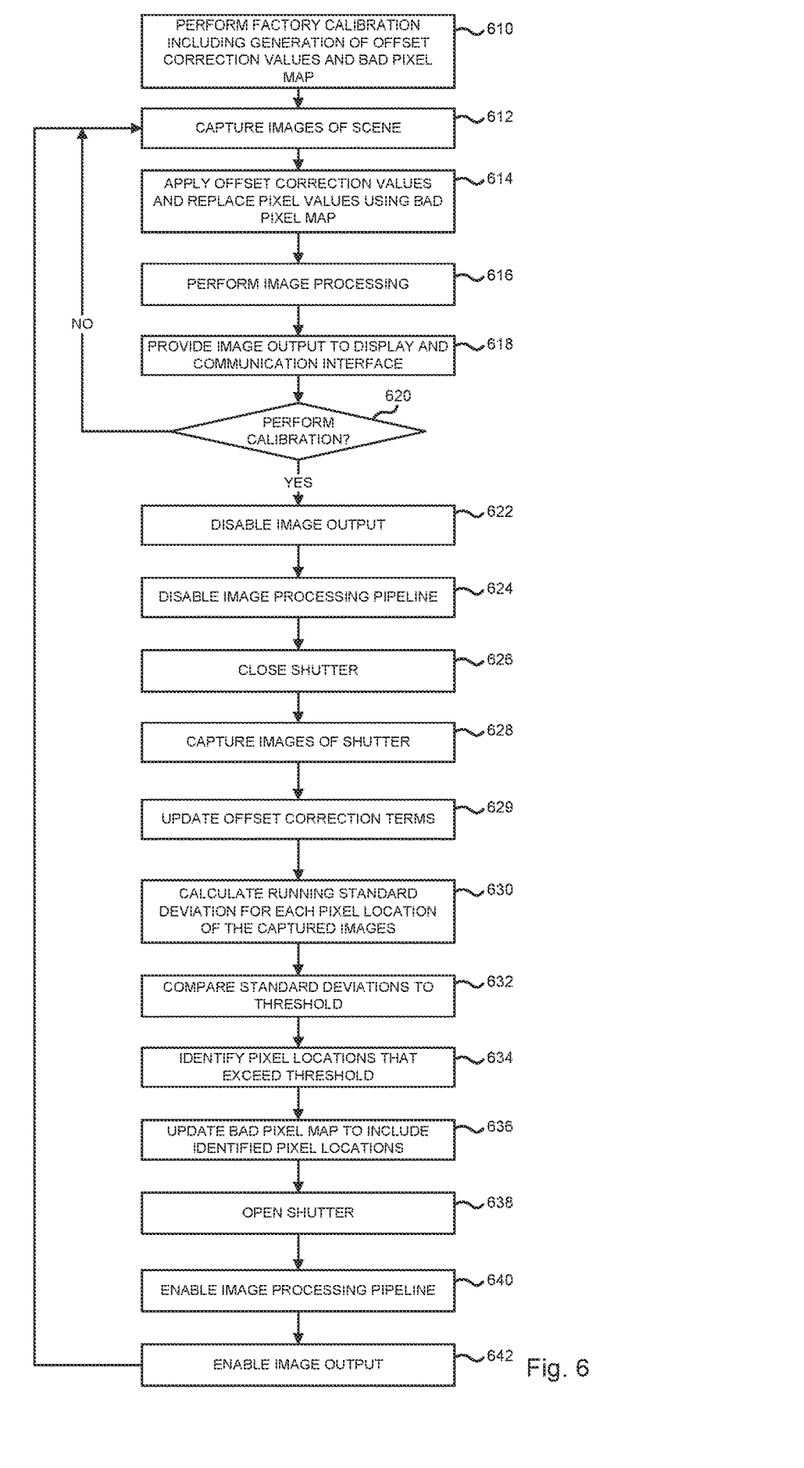
FIG. 6 illustrates a process of detecting anomalous pixels in accordance with an embodiment of the disclosure.

FIG. 6 illustrates a process of detecting anomalous pixels in accordance with an embodiment of the disclosure. In various embodiments, process of FIG. 6 may be performed by logic device 168 and other appropriate components of imaging device 100.

In block 610, a factory calibration is performed to generate offset correction terms 330 and bad pixel map 320 using thermal images captured by imager 164. For example, in some embodiments, imager 164 may capture one or more thermal images of a uniform black body may be positioned in scene 110 while shutter 102 is in open position 102A and/or one or more thermal images of surface 104 of shutter 102 while shutter 102 is in the closed position 102B. Logic device 168 may process the images to determine initial factory values for offset correction terms 330 and bad pixel map 320. Following the factory calibration of block 610, a user may begin run-time operation of imaging system 100 in the field.

In block 612, imager 164 captures one or more thermal images of scene 110 while shutter is in open position 102A.

In blocks 614 and 616, logic device 168 processes the captured thermal images in image processing pipeline 310.

For example, in block 614, logic device 168 updates the thermal images by applying offset correction terms 330 and replaces bad pixels identified in bad pixel map 320. In block 616, logic device 168 performs further image processing as discussed.

In block 618, logic device 168 provides the processed thermal images to display 178 and/or communication interface 174 as discussed.

In block 620, logic device 168 determines if a run-time calibration has been initiated, for example, as discussed with regard to block 410 of FIG. 4. If a calibration has been initiated, then the process continues to block 622. Otherwise, the process returns to block 612 where additional thermal images are captured of scene 110.

In block 622, logic device 168 disables the output of thermal images provided to display 178 and/or communication interface 174 as discussed regard to block 420 of FIG. 4. In block 624, logic device 168 disables some or all processing performed by image processing pipeline 310 as discussed with regard to block 420 of FIG. 4.

In block 626, logic device 168 operates actuator 103 to move shutter 102 to closed position 102B as discussed with regard to block 430 of FIG. 4.

In block 628, logic device 168 operates imager 164 to capture a plurality of thermal images of surface 104 of shutter 102 while it is in the closed position 102B as discussed with regard to block 430 of FIG. 4.

In block 629, logic device 168 updates offset correction terms 330 using the captured thermal images of surface 104 as discussed with regard to block 430 of FIG. 4.

In block 630, logic device 168 calculates a standard deviation for each pixel of the thermal images captured in block 628 to populate standard deviation map 340 as discussed with regard to sub-block 442 of FIG. 4. As discussed, in various embodiments, the standard deviation may be a full standard deviation where a plurality of thermal images may be stored and then the standard deviation for each pixel may be calculated using the stored thermal images, or may be a running standard deviation where the standard deviation is updated in realtime with each new captured thermal image. Accordingly, block 630 may further include updating the standard deviation.

In block 632, logic device 168 compares the standard deviations determined in block 630 with a threshold as discussed with regard to sub-block 444 of FIG. 4. For example, using the values provided in Table 1, logic device 168 may compare the values in the standard deviation column with a predetermined threshold (e.g., 200 or other threshold as appropriate).

As discussed, in some embodiments, the threshold may be a predetermined threshold, or may be scaled to a mean standard deviation calculated for all pixel locations collectively. Accordingly, in some embodiments, block 632 may include calculating a mean standard deviation of all pixels for the captured thermal images and updating the threshold to correspond to the calculated mean standard deviation.

In block 634, logic device 168 identifies the standard deviations that exceed the threshold to populate noisy pixel map 350 as discussed with regard to sub-block 444 of FIG. 4. For example, using the values provided in Table 1, logic device 168 may identify that pixels 502(1), 502(2), and 503(1) exceed the threshold, while pixel 501 does not.

In block 636, logic device 168 updates bad pixel map 320 with the pixels identified in noisy pixel map 350 as discussed with regard to sub-block 446 of FIG. 4. Accordingly, the flickering anomalous pixels having standard deviations that exceed the threshold will be identified in bad pixel map 320 and therefore will be replaced during further processing of captured thermal images performed in subsequent iterations of block 614.

In block 638, logic device 168 operates actuator 103 to move shutter 102 to open position 102A. In block 640, logic device 168 enables the processing performed by image processing pipeline 310 as discussed with regard to block 450 of FIG. 4. In block 642, logic device 168 enables the output of thermal images provided to display 178 and/or communication interface 174 as discussed regard to block 450 of FIG. 4. Following block 642, the process returns to block 612 where additional thermal images are captured of scene 110.

Accordingly, it will be appreciated that blocks 630 through 642 may be performed to perform a flickering anomalous pixel detection while shutter 102 is in closed position 102B while simultaneously updating offset correction terms during a shared calibration time period 425. As a result, anomalous pixels may be detected and subsequently corrected in the field without introducing additional interruption to the operation of imaging device 100. Moreover, such an approach provides improved image quality by permitting the correction of anomalous pixels that were not detected during the factory calibration of block 610 or that may change over time.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:
1. A method comprising:
   storing a bad pixel map that identifies static anomalous pixels identified during a factory calibration of a thermal imager of an imaging device;
   initiating a run-time in-field calibration of the thermal imager, the calibration comprising:
      capturing, by the thermal imager, a plurality of thermal images in response to infrared radiation received from a uniform black body, wherein the thermal images comprise a plurality of pixels each having an associated pixel value for each of the thermal images, determining, for each pixel, a temporal standard deviation of its associated pixel values corresponding to the same pixel location for each of the thermal images, comparing the standard deviations with a threshold, and identifying a subset of the pixels as flickering temporally anomalous pixels in response to the comparing; and updating the bad pixel map to further identify the flickering temporally anomalous pixels identified during the run-time in-field calibration of the thermal imager.

2. The method of claim 1, wherein the uniform black body is a surface of a shutter of the imaging device.

3. The method of claim 2, further comprising:
translating the shutter to a closed position to present the surface to the thermal imager.

4. The method of claim 3, wherein the run-time calibration further comprises updating offset correction terms using the captured thermal images to reduce fixed pattern noise associated with the thermal imager.

5. The method of claim 1, wherein the thermal images are a first plurality of thermal images, the method further comprising:
capturing a second plurality of thermal images of a scene; and
replacing pixel values of the second plurality of thermal images using the bad pixel map.

6. The method of claim 1, wherein the standard deviation for each of the pixels is a running standard deviation updated in realtime as each of the thermal images are captured.

7. The method of claim 1, further comprising storing the captured thermal images, wherein the standard deviation for each of the pixels is a full standard deviation determined from the stored thermal images.

8. The method of claim 1, wherein the threshold is a predetermined threshold or a mean standard deviation of all pixels for the captured thermal images.

9. The method of claim 1, wherein the imaging device is a portable thermal camera.

10. A system comprising:
a thermal imager configured to capture a plurality of thermal images in response to infrared radiation received from a uniform black body, wherein the thermal images comprise a plurality of pixels each having an associated pixel value for each of the thermal images;

a memory configured to store a bad pixel map that identifies static anomalous pixels identified during a factory calibration of the thermal imager; and a logic device configured to:
initiate a run-time in-field calibration of the thermal imager by performing operations comprising:
determine, for each pixel, a temporal standard deviation of its associated pixel values corresponding to the same pixel location for each of the thermal images,
compare the standard deviations with a threshold, and
identify a subset of the pixels as flickering temporally anomalous pixels in response to the comparing, and
update the bad pixel map to further identify the temporally anomalous pixels identified during the run-time in-field calibration of the thermal imager.

11. The system of claim 10, wherein the uniform black body is a surface of a shutter of the system.

12. The system of claim 11, wherein the logic device is configured to:
translate the shutter to a closed position to present the surface to the thermal imager.

13. The system of claim 12, wherein the logic device is configured to update offset correction terms using the captured thermal images to reduce fixed pattern noise associated with the thermal imager, wherein the run-time calibration comprises the update.

14. The system of claim 10, wherein the thermal images are a first plurality of thermal images, and wherein:
the thermal imager is configured to capture a second plurality of thermal images of a scene; and
the logic device is configured to replace pixel values of the second plurality of thermal images using the bad pixel map.

15. The system of claim 10, wherein the standard deviation for each of the pixels is a running standard deviation updated in realtime as each of the thermal images are captured.

16. The system of claim 10, further comprising:
a memory configured to store the captured thermal images; and
wherein the standard deviation for each of the pixels is a full standard deviation determined from the stored thermal images.

17. The system of claim 10, wherein the threshold is a predetermined threshold or a mean standard deviation of all pixels for the captured thermal images.

18. The system of claim 10, wherein the system is a portable thermal camera.

* * * * *

UNITED STATES PATENT AND TRADEMARK OFFICE
CERTIFICATE OF CORRECTION

| | | |
|---|---|---|
| PATENT NO. | : 12,166,959 B2 | Page 1 of 1 |
| APPLICATION NO. | : 17/543538 | |
| DATED | : December 10, 2024 | |
| INVENTOR(S) | : Julie R. Moreira and Stephanie Lin | |

It is certified that error appears in the above-identified patent and that said Letters Patent is hereby corrected as shown below:

In the Specification

Column 7, Lines 11-12, change "U.S. Patent Application Ser. No." to --U.S. Patent Application No.--.

Signed and Sealed this
Fourth Day of February, 2025

Coke Morgan Stewart
*Acting Director of the United States Patent and Trademark Office*